E. G. MARTIN.
END-GATE.
No. 169,461.  Patented Nov. 2, 1875.
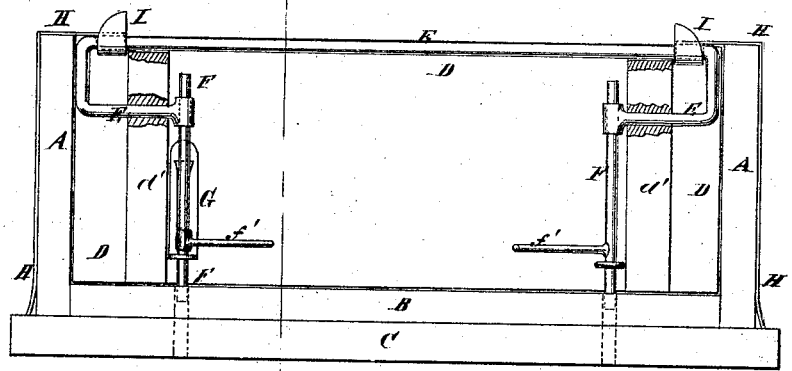
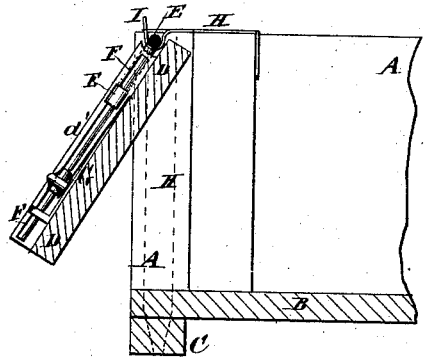
WITNESSES:  INVENTOR:
A. W. Almqvist  E. G. Martin
Alex F. Roberts  BY Munn & Co.
  ATTORNEYS.

UNITED STATES PATENT OFFICE.

EDWARD G. MARTIN, OF KANKAKEE, ILLINOIS.

IMPROVEMENT IN END-GATES.

Specification forming part of Letters Patent No. 169,461, dated November 2, 1875; application filed October 16, 1875.

*To all whom it may concern:*

Be it known that I, EDWARD GEORGE MARTIN, of Kankakee, in the county of Kankakee and State of Illinois, have invented a new and useful Improvement in End-Gates for Vehicle Bodies, of which the following is a specification:

Figure 1 is an end view of a vehicle body, to which my improved gate has been applied. Fig. 2 is a section of the same, taken through the line $x\ x$, Fig. 1.

Similar letters of reference indicate corresponding parts.

The object of this invention is to furnish an improved end-gate for vehicle bodies, which shall be so constructed that it may be easily released at its lower edge and swung outward to dump the load, and may be readily attached and detached, and which shall be simple in construction, strong, durable, and not liable to get out of order, or have any of its parts lost.

The invention consists in the combination of the rod, the bolts, the straps, and the hooks with the gate and the side boards of a vehicle body; and in the combination of the springs with the bolts of the fastening device, as hereinafter fully described.

A represents the side boards, B the bottom boards, C the cross-bar or bottom-board brace, and D the end board or gate, of a vehicle body. E is a rod, which extends along the outer side of the upper edge of the gate D, and is notched into the upper ends of the cleats $d'$ of said gate. At the ends of the gate D the rod E is bent downward at right angles, and is then bent inward at right angles, and passes through cross-grooves in the inner sides of the cleats $d'$, so as to be firmly and rigidly secured in place by said cleats without any other fastening.

In the ends of the rod E, at the inner edges of the cleats $d'$, are formed eyes to receive the bolts F, the lower ends of which enter holes in the bottom boards B, the said holes extending through the bottom boards B and cross-bar C, so that the said bolts may push out anything that may have fallen into the said holes. The bolts F are provided with handles $f'$ for convenience in operating them.

The lower parts of the bolts F may pass through staples attached to the gate D, or through eyes in the lower ends of the springs G, which are placed between the bolts F and the gate D. The sides of the bolts F have notches formed in them to receive the edges of the springs G, so that the said springs may hold the said bolts in place, both when raised and when lowered. The notches are formed in the bolts F in such positions that the springs G can enter them only when the levers $f'$ are turned against the gate D, so that by turning the levers $f'$ outward the bolts can be easily slid up and down. H are straps, the lower ends of which pass through the ends of the cross-bar C, and are secured to said cross-bar. The straps H pass up across the rear ends of the side boards A, and their upper ends have cross-heads formed upon them, and are bent over and secured to the upper edges of said side boards. Upon the upper ends of the straps H are formed hooks I, which project to the rearward, so as to cross the upper edge of the gate D, and hook upon the rod E, the outer side of the said gate being notched or recessed to form spaces for the passage of the hooks I beneath the rod E. The gate D thus swings upon the hooks I, and may be easily attached to and detached from said hooks, and at the same time the hooks I hold the gate down and prevent it from jumping when in use.

By this construction the straps H prevent the rear ends of the side boards from splitting, and from being forced outward by the pressure of the load.

Having thus described my invention, I claim as new and desire to secure by Letters Patent—

1. The combination of the rod E, the bolts F, the straps H, and the hooks I with the gate D $d'$ and the side-boards A of a vehicle body, substantially as herein shown and described.

2. The combination of the spring G with the bolts F of the device E F H I, substantially as herein shown and described.

EDWARD GEORGE MARTIN.

Witnesses:
 THEOPHILE MARTIN,
 J. FOUNTAIN.